Figure 1:
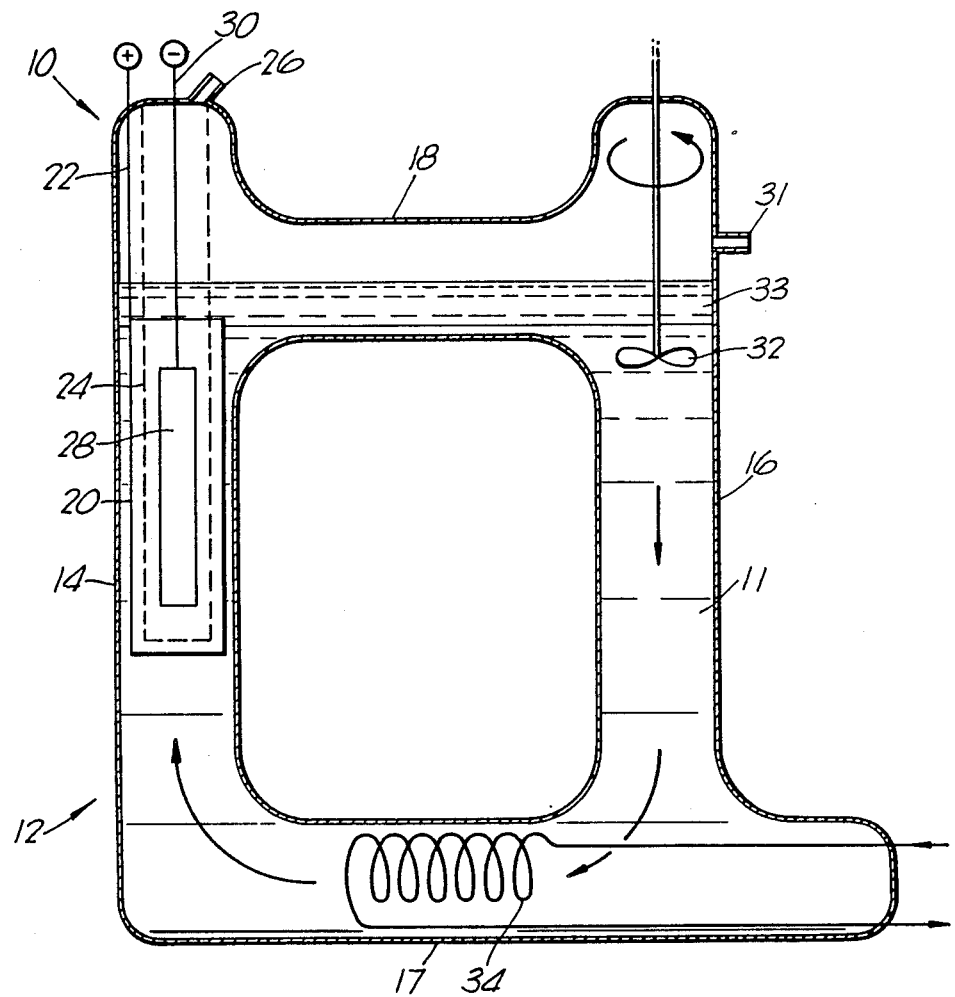

United States Patent [19]

Steele

[11] Patent Number: 4,874,485

[45] Date of Patent: Oct. 17, 1989

[54] METHOD FOR THE TREATMENT OF WASTE MATTER

[75] Inventor: David F. Steele, Caithness, United Kingdom

[73] Assignee: United Kingdom Atomic Energy Authority, London, United Kingdom

[21] Appl. No.: 205,848

[22] Filed: Jun. 13, 1988

[30] Foreign Application Priority Data

Jun. 29, 1987 [GB] United Kingdom ................. 8715195
Jun. 29, 1987 [GB] United Kingdom ................. 8715196

[51] Int. Cl.$^4$ .............................................. C02F 1/46
[52] U.S. Cl. ..................................... 204/130; 204/149
[58] Field of Search ............................... 204/130, 149

[56] References Cited

U.S. PATENT DOCUMENTS

| | | | |
|---|---|---|---|
| 3,755,130 | 8/1973 | Zabolotny | 204/237 |
| 3,793,171 | 2/1974 | Zabolotny et al. | 204/130 |
| 3,890,244 | 6/1975 | Carlin | 204/105 R |
| 3,953,305 | 4/1976 | Connolly | 204/97 |
| 3,994,790 | 11/1976 | Inoue | 204/130 |
| 4,004,993 | 1/1977 | Horner et al. | 204/131 |
| 4,217,192 | 8/1980 | Lerch et al. | 204/149 |
| 4,468,297 | 8/1984 | Sawyer et al. | 204/59 R |
| 4,564,432 | 1/1986 | Nagai et al. | 204/237 |
| 4,647,349 | 3/1987 | Kreh et al. | 204/59 R |
| 4,701,246 | 10/1987 | Fujita et al. | 204/130 |
| 4,749,519 | 6/1988 | Koehly et al. | 252/627 |

FOREIGN PATENT DOCUMENTS

| | | |
|---|---|---|
| 0030068 | 8/1980 | European Pat. Off. . |
| 0055476 | 12/1981 | European Pat. Off. . |
| 0102762 | 8/1983 | European Pat. Off. . |
| 0089185 | 9/1983 | European Pat. Off. . |
| 0162356 | 5/1985 | European Pat. Off. . |
| 0158555 | 10/1985 | European Pat. Off. . |
| 0160589 | 11/1985 | European Pat. Off. . |
| 2726206 | 6/1977 | Fed. Rep. of Germany . |
| 1054119 | 1/1967 | United Kingdom . |
| 1117308 | of 1968 | United Kingdom . |
| 1203434 | 8/1970 | United Kingdom . |
| 2125068 | 8/1983 | United Kingdom . |
| 2163594 | 7/1984 | United Kingdom . |

Primary Examiner—T. M. Tufariello
Attorney, Agent, or Firm—William R. Hinds

[57] ABSTRACT

An electrochemical method for treating matter particularly waste matter in which AgII ions are primary oxidising species in an aqueous nitric acid electrolyte at about 50° C., produce secondary oxidising species through interaction with the electrolyte and which decompose the waste matter.

AgI ions produced in the course of the decomposition are converted back to AgII electrochemically.

14 Claims, 2 Drawing Sheets

METHOD FOR THE TREATMENT OF WASTE MATTER

This invention relates to the treatment of waste matter and is particularly, but not necessarily exclusively, concerned with the treatment of organically-based waste matter contaminated with radioactive material.

According to a first aspect of the present invention there is provided a method of treating organic waste matter in which an aqeous electrolyte comprising nitric acid and containing silver ions as an electrochemically regenerable primary oxidizing species is subjected to an electrical potential at a temperature above 50° C. to produce secondary oxidising species from the interaction of the primary oxidising species and the aqueous electrolyte, and the organic waste matter is added to the electrolyte either continuously or periodically whereby decomposition of the initially and the subsequently added organic waste matter is predominantly effected by the secondary oxidising species, the primary oxidising species following reduction in the course of the interaction with th e aqueous electrolyte being regenerated by the electric potential.

Advantageously, the electrolyte might also include cobalt ions.

For some applications of the invention, the temperature may be 55° C., but for other applications a temperature range of 55° C. to 80° C., or 70° C. to 90° C. may be used to improve the decomposition process.

The waste matter may be added to the aqueous electrolyte continuously or in a batchwise manner at a rate compatible with the decomposition rate of the previously added waste matter.

The effect of the invention is surprising, since a parasitic reaction of AgII with water would be expected to reduce the efficiency of the treatment. However, the secondary oxidising species so produced from this apparently parasitic reaction e.g. OH and other radicals, are effective in decomposing the waste matter.

The waste matter may be contaminated with toxic material such as radioactive species or it may comprise spent nuclear fuel such as uranium carbide fuel.

The invention finds particular application in the case of organically-based waste matter although usable in other applications involving suitable, oxidatively decomposable matter. The term "organically-based waste matter" as used herein is to be construed as referring both to waste matter which essentially consists of organic groupings and waste matter containing organic groupings and other groupings.

The waste matter might comprise a liquid such as a solvent derived from the reprocessing of nuclear fuel, or contaminated hydraulic fluid, oil, grease, or soluble oil, but not liquids based on silicones.

The waste matter may have a polymeric structure and may comprise cellulose, rubber, plastics, or an ion exchanger (anionic or cationic, divinylbenzene/styrene copolymer or phenol/formaldehyde or similar skeleton), or epoxy resin. The ion exchanger may be loaded with cations such as heavy metals or radioactive species.

It is preferable that the nitric acid has a concentration in the range 4M to 16M, but the electrolyte may comprise a mixture comprising nitric acid and sulphuric acid or a mixture comprising nitric acid and phosphoric acid.

Air or oxygen may be passed into the catholyte to at least partially convert nitrogen oxides produced from th e nitric acid during the electrolysis back to nitric acid. The nitric acid may also be recovered by extracting and scrubbing any $NO_x$ produced at the cathode using dilute nitric acid or water followed by reconcentration and recycle to the catholyte.

Conveniently, the waste matter is decomposed, by the secondary oxidising species to generate components which preferably are non-toxic, e.g. carbon dioxide and water. In one application where the waste matter comprises a mixture of tributyl phosphate and kerosene (TBP/OK) the waste matter may be decomposed to generate carbon dioxide, water, traces of short chain hydrocarbon molecules and an inorganic oxy-acid, namely phosphoric acid. In this application the tributylphosphate may be decomposed at a slower rate than the kerosene so that selective decomposition may be achieved.

The temperature may be up to about 90° C., e.g. the temperature may be within the range 55° to 80° C. or 70° C. to 90° C. A higher temperature may also lead to an increase in the rate of the overall decomposition.

The method of the first aspect of the invention may include an additional step prior to the application of an electric potential to the electrolyte in which the matter is partially decomposed or treated to render it more soluble in the electrolyte. For example, the additional step may comprise contacting the waste matter with an acid such as nitric acid while heating the acid, in which case the waste matter may be subsequently cooled to the appropriate predetermined temperature before application of the electric potential to the electrolyte. The additional step may also comprise treatment of the waste matter with ozone.

The method of the first aspect of the invention may also include steps wherein at least a portion of the catholyte thereof is withdrawn and regenerated by feeding the catholyte portion to a packed column such that the catholyte portion descends through the packed column, heating an aqueous solution comprising nitric acid such that the heated nitric acid refluxes into the packed column, and passing an oxygen-containing gas into the catholyte portion, whereby the catholyte portion is converted substantially to nitric acid as it descends in the packed column. The withdrawal and regeneration of the portion of the catholyte may be arranged so as to recycle regenerated catholyte to the electrolyte and maintain a relatively low catholyte nitrous acid concentration in the electrolyte. The method may include inhibiting the migration of anions from the catholyte to the anolyte in the electrolyte.

In a second aspect the invention provides a method for regenerating an aqueous liquid comprising nitrous acid and or dissolved oxides of nitrogen, the method comprising feeding the liquid to a packed column such that the liquid descends through the packed column, heating an aqueous solution comprising nitric acid such that the heated said nitric acid refluxes into the packed column, and passing an oxygen-containing gas into the liquid, whereby the liquid is converted substantially to nitric acid as it descends in the packed column.

Preferably, the packed column is heated by the refluxing nitric acid to between 107° C. and 112° C.

The aqueous liquid may include nitrogen dioxide, and or nitric oxide.

Desirably, the aqueous liquid before it is fed to the packed column passes through a regenerative heat exchanger where it is heated by the converted nitric acid which is thereby cooled.

It will be understood that the invention includes a method of the first aspect in which at least a portion of the catholyte thereof is withdrawn and regenerated by the method of the second aspect of the invention.

In a third aspect of the invention, there is provided apparatus for performing the method of the second aspect of the invention, the apparatus comprising a packed column, refluxing boiler means, means for injecting an oxygen-containing gas into the packed column, a duct for connecting the boiler means to or near the bottom of the packed column, and an inlet port for entry of liquid to be regenerated at or near the top of the packed column.

Desirably, a regenerative heat exchanger is provided, with a duct connecting the regenerative heat exchanger to the inlet port, and the discharge from the boiler means being connectable to the heat exchanger.

Figure 2:
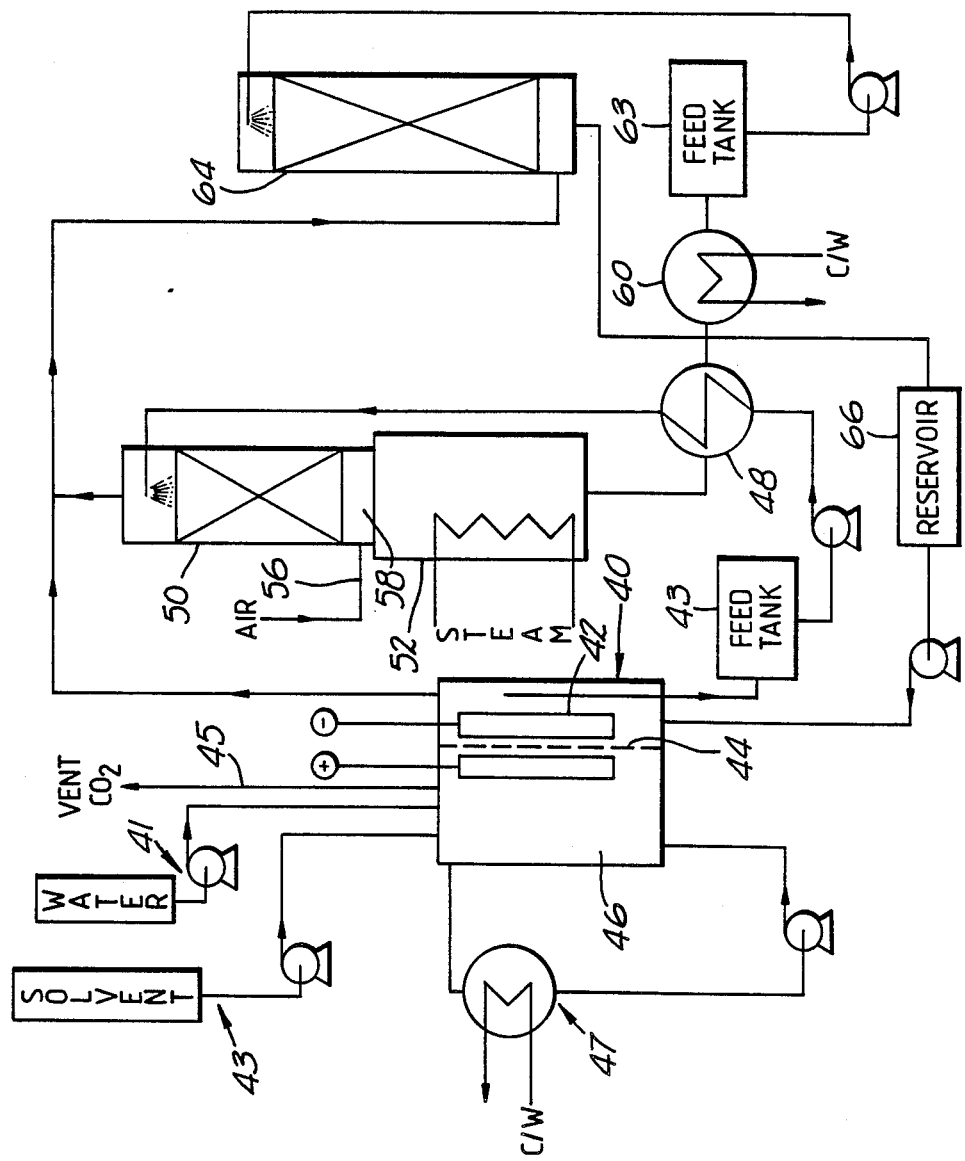

The invention will now be further described, by way of example only, with reference to the Examples and the accompanying FIGS. in which:

FIG. 1 is a diagrammatic representation of a cell for carrying out the decomposition of waste matter, and FIG. 2 is a schematic representation of a system for regenerating nitric acid catholyte from the cell of FIG. 1.

EXAMPLE 1

| | |
|---|---|
| Anolyte: | $HNO_3$ (6M)$AgNO_{3(1M)}$ |
| Catholyte: | $HNO_3$ (12M) |
| Anode: | Platinum, area 225 $cm^2$ |
| Cathode: | Water cooled stainless steel cylinder |

Organically-based liquid comprising TBP, kerosene or 30% TBP/OK was added in aliquots (up to 250 ml) to anolyte (5 liters) at a temperature of 50° to 70° C. A current of up to 70 A was passed at a cell voltage of about 8 V to decompose the liquid. The catholyte was circulated from a reservoir to the cathode compartment and then returned to the reservoir via a heat exchanger to cool the nitric acid and hence prevent loss by evaporation. The heat generated by passage of the current served to maintain the temperature in the range 50° to 70° C.

The off-gas produced during the decomposition was shown, by mass spectrometry, to contain up to 99% carbon dioxide, some oxygen, and traces of alkanes. The high percentage of carbon dioxide suggests a high electrochemical efficiency.

EXAMPLE 2

The anode of Example 1 was replaced with a platinum anode of 34 $cm^2$. Operation of the cell was then possible up to over 1 amp/$cm^2$ anode current density. The electrochemical efficiency decreased with increasing current density, but 80–90% efficiency based on the percentage of $CO_2$ in the anolyte off-gas was still achievable at 1 amp/$cm^2$ current density.

The cell in Example 1 was cooled to 20° C. and operated with the same anode current density. Under these conditions the electrochemical efficiency based on the percentage of $CO_2$ in the anolyte off-gas was only 40–60% compared to the 70–90% achievable at 50°–70° C.

One of the oxidation products from TBP/OK is phosphoric acid. Silver orthophosphate ($Ag_3PO_4$) is freely soluble in nitric acid stronger than 1 molar but forms a granular precipitate in weaker acid or neutral solutions. Thus, during destruction of TBP/OK the phosphate concentration can be allowed to build up in the anolyte to some extent but the value of the Ag will make recovery economically necessary. One way to do this is to precipitate the Ag as the orthophosphate by reducing the acidity of the anolyte and dissolving the separated precipitate in fresh acid to make up the next batch of anolyte. Some phosphate is returned to the anolyte, but this should not affect the process.

The acidity of the anolyte can be reduced by neutralization using NaOH, etc if the nitric acid is not to be recovered. At a suitably low acidity, the $Ag_3PO_4$ would precipitate and the essentially Ag-free supernatant could be discarded. If acid recovery was necessary, the nitric acid could be removed from the anolyte by distillation and used to make up the next batch of anolyte, which would leave a solution containing Ag and phosphoric acid. Neutralization of this solution would precipitate $Ag_3PO_4$ for recycle and leave a neutral solution of sodium phosphate (mainly) for disposal.

EXAMPLE 3

Shredded rubber gloves (9 g) was heated under reflux in nitric acid (6M) for 1.5 hours to give some reaction and a final acidity of 4.8M. Further nitric acid (50 ml, 16M) was added and the resulting mixture heated under reflux. After 1 hour very little solid remained. Heating under reflux was continued overnight, the mixture allowed to cool, $AgNO_3$ added to give 0.1M $AgNO_3$ and a current (2A) passed to decompose the rubber and give a final acidity of 7.4M and no organic residue.

Direct reaction of rubber and silver (II)/nitric acid can be achieved by heating the anolyte to 80°–90° C. It is believed that at this temperature the oxidation process comprises both reaction of the rubber with silver (II) and with a secondary oxidising species arising from the reaction of silver (II) and water, and the reaction of the rubber with nitric acid to form lower molecular weight organic species which can then react with the silver (II) or with the secondary oxidising species produced from the reaction of silver (II) and water.

EXAMPLE 4

A similar procedure to that in Example 3 was employed with a latex compound, Detex (10.5 g), and with the addition of 50 ml of 16M nitric acid. The mixture was heated under reflux for 4 hours to give a yellow solution which, after cooling and addition of $AgNO_3$ was subjected to a current of 2A to destroy the latex compound and leave no organics.

EXAMPLE 5

Waste matter in the form of pipette tips (11.5 g) comprising high density polyethylene were heated under reflux in nitric acid (150 ml, 16M) for 18 hours. When no more dissolution appeared to be taking place, the solution was filtered to give a solution (probably containing some degraded polyethylene) and some insoluble material (5 g). $AgNO_3$ was added to the cooled solution to give a concentration of 0.1M and a current (2 to 4A) passed to destroy the dissolved organics.

Under the same conditions a piece of low density polyethylene was destroyed and more rapidly.

EXAMPLE 6

(i) Uranium carbide (27 g) was dissolved in nitric acid (7M, 100 mls) to give a dark red/brown solution containing uranyl nitrate and waste matter in the form of organic material generated on the dissolution of the uranium carbide in the nitric acid.

(ii) 50 mls of the solution from (i) were electrolysed using platinum electrodes and a porous separator. A current of about 2A was passed for 90 minutes, after which time the red organic colour had faded and the solution was the normal uranyl nitrate colour.

(iii) A further 50 ml aliquot of the solution from (i) was electrolysed using a current of about 2A and in the presence of silver (0.05M) until a dark brown colour persisted when the current was switched off. The temperature rose to 55° C. during the electrolysis.

(iv) The electrolysed solution from (ii) was made up to 0.05M Ag and a current of 2A passed. Initially, the dark brown colour of silver (II) did not persist for more than a few seconds after the current was switched off, indicating that organic material was still present at the end of the electrolysis experiment (ii) in which silver (II) was not present. After about 30 minutes, a persistent silver (II) colour was produced in the anolyte indicating that all of the organic material had now been destroyed. The anolyte temperature rose to 55° C. during the electrolysis.

A possible explanation of the above is that when uranium carbide is dissolved in nitric acid, organic material is generated which comprises carboxylic acid components such as melittic acid. Electrolysis without silver (II) being present may destroy the carboxylic acids via a Kolbe type reaction:

$$2RCOO^- \rightarrow R_2 + 2CO_2 + 2e^-$$

$$RCOO^- \rightarrow R\cdot + CO_2 + e^-$$

The radical formed in the second reaction would probably react further to form organic product(s) which can be destroyed by electrolysis in the presence of silver (II). The product from the first reaction would be fairly high molecular weight aromatic hydrocarbons if carboxylic acids like melittic acid are present after uranium carbide has been dissolved in nitric acid.

EXAMPLE 7

| Anolyte: | $HNO_3(6M)/AgNO_3(1M)$ |
|---|---|
| Catholyte: | $HNO_3(12M)$ |
| Anode: | Platinum |
| Cathode: | Platinum |

7.35 grams of broken and powdered "Tufnol" (fabric-reinforced epoxy resin composite) was stirred in the anolyte at 50°-70° C. and a current of 6 amps was passed. Initially a brown Ag(II) colour was only visible in the vicinity of the anode, indicative of reaction of the epoxy resin with the anolyte. Analysis of the off-gas from the anolyte showed it to contain 87% $CO_2$ and 5% CO, the remainder being $O_2$. There was some sign of reaction between the epoxy resin and the nitric acid in the anolyte as evidenced by the presence of a brown coloration of $NO_x$ in the anolyte off-gas. This is in no way deleterious as the highly oxidising conditions in the anolyte ensure that most of the $NO_x$, $HNO_2$ etc resulting from the direct reaction are re-oxidised to $HNO_3$. The overall effect is that resin is oxidised and the oxidising species is regenerated just as if Ag(II) was involved in the reaction.

Eventually the whole solution became dark brown due to the presence of Ag(II) throughout. This indicated that all of the "Tufnol" had been destroyed and oxidised to $CO_2$ and water. Analysis of the anolyte off-gas at this stage showed it to consist predominantly of $O_2$ in support of this.

EXAMPLE 8

Conditions as in Example 7

11.68 grams of hydraulic oil (Shell D46, phosphate ester - probably aromatic ester) was added to the anolyte at 50°-70° C. with 6A current flowing through the cell. A bright yellow colour developed and the Ag(II) colour was confined to the vicinity of the anode, indicating that reaction was taking place. Analysis of the anolyte off-gas showed it to contain 85% $CO_2$ and 11% CO, the remainder consisting of $O_2$. Eventually the entire anolyte showed a dark brown Ag(II) colour when all of the hydraulic oil had been oxidised to $CO_2$ water and $H_3PO_4$. In both this and Example 7 considerably more CO was generated in percentage terms than was the case when aliphatic substrates were being destroyed.

EXAMPLE 9

Conditions as in Example 7.

15.2 grams of Amberlite IR400 anion exchange resin (crosslinked divinylbenzene/styrene copolymer with quarternary ammonium groups) was stirred in the anolyte used in Example 7 at 50°-70° C. with a current of 7 amps. Once again the Ag(II) colour was confined to the vicinity of the anode indicating reaction was taking place. A sample of the anolyte off-gas was taken after 2 hours oxidation and consisted of 77% $CO_2$, 18% CO and 5% $O_2$. As the resin was reacted in the as-supplied chloride form, $Cl_2$ was sought in the off-gas but none was found, nor was there any precipitate of AgCl. It is surmised that the chloride from the resin was oxidised to chlorate of perchlorate by the Ag(II). After reacting overnight, the resin had completely disappeared and the solution had a dark brown AgII colour which did not fade rapidly when the current was switched off, indicating the absence of organics in the anolyte.

EXAMPLE 10

Conditions as in Example 7.

The anolyte was used again to destroy 20 grams of 200 mesh Amberlite IR120 cation ion exchange resin (crosslinked divinylbenzene/styrene copolymer with sulphonic acid groups) at 50°-70° C. with a current of 6 amps. Analysis of the anolyte off-gas after 2 hours showed it to consist of 77% $CO_2$, 20% CO and 3% $O_2$. Current was passed overnight after which time the anolyte had a dense brown Ag(II) colour throughout, indicating that no organic material remained, and all of the resin had been destroyed.

EXAMPLE 11

Conditions as in Example 7.

The anolyte was used to destory 17.4 grams of Duolite ARC9359 (sulphonated phenol/formaldehyde resin in the H+ form) at 50°-70° C. with a current of 6 amps. There was some sign of direct reaction of this resin with the anolyte as $NO_x$ was visible in the off-gas. After 7 hours all of the resin had been destroyed and the anolyte had a dense brown Ag(II) colour throughout, indicating that no organics remained in solution. A sample of the off-gas taken during the destruction contained $CO_2$ and CO(IR spectroscopy).

In all of the above Examples the anolyte and catholyte were separated by a porous separator comprising a glass sinter or a ceramic material, but any suitable porous separator material with the required porosity and chemical resistance may be used (e.g. microporous PTFE). Alternatively, an ion exchanger membrane such as sulphonated fluoropolymer ("Nafion") or similar membrane may be used.

Referring now to FIG. 1, an electrochemical cell 10, containing an electrolyte 11 comprising nitric acid, comprises a vessel 12 having generally vertical limbs 14, 16 which are connected together near to their upper and lower ends by generally horizontal conduits 17, 18 respectively. The limbs 14, 16 and conduits 17, 18 are circular in cross-section and are typically of the order of 20 cm in diameter.

A tubular anode 20, open at both ends, is located within the limb 14 with the longitudinal axes of the anode 20 and limb 14 co-axial. The anode 20, which can have a solid or perforated mesh construction, is connected to an electric supply (not shown) via an anode support 22 which is joined to one end of the anode 20. A solid cylindrical cathode 28, is supported by a cathode support 30 (which also connects the cathode to the electric supply) so that the cathode extends lengthwise of the anode 20. A hollow cylindrical porous separator 24, closed at its lower end, depends from the upper end of the limb 14 such that the lower portion of the separator 24 is disposed in an annular space defined between the anode 20 and cathode 28. The upper end of the limb 14 is provided with a vent 26 which communicates with the space enclosed by the porous separator 24, and the upper end of the limb 16 is provided with an inlet 31 for introduction of waste matter. Other ports (not shown) may be provided for venting of decomposition products.

An impeller 32 is disposed within the limb 16 for circulating the electrolyte 11 past the anode 20. A heat exchanger 34 is located in the conduit 17 which can be operated selectively as a cooler or heater according to the temperature conditions to be established or maintained in the cell 10 and the exothermic reactions taking place in the cell 10.

In use, the electrolyte 11 which typically comprises an anolyte of nitric acid (4–12M) containing silver nitrate (at least 0.05M), and a catholyte of nitric acid (6–16M) is mixed by the impeller 32 with waste matter to be decomposed. The waste matter is introduced via the inlet 31 either continuously or batchwise and is drawn downwardly by the impeller 32 and caused to mix with the anolyte. The mixed contents of the cell 10 are passed down through the limb 16, along the conduit 17, up through the limb 14 and past the anode 20, and back into the limb 16 via the conduit 18. Any nitrogen oxides generated from the nitric acid by electrolysis exit the cell 10 through the vent 26 and are subsequently scrubbed. The scrubbed nitrogen oxides can be converted back to nitric acid and fed back into the cell 10, or fresh nitric acid may be added to the cell 10 to replace nitric acid lost via evolution of nitrogen oxides.

Although the presence of silver ions is necessary for operation of the cell 10, there may be economic advantages in the addition of cobalt ions in the electrolyte 11. Whereas cobalt by itself in the electrolyte has a poor electrochemical efficiency, due to the slow oxidation kinetics of CoII at the anode, an addition of even a low concentration of AgII improves the efficiency. For example, 0.6M cobalt nitrate and 0.0025M silver nitrate in $5MHNO_3$ operated considerably more effectively than cobalt alone in the electrolyte and this may be because of a synergistic effect from the Co+Ag mixture. It is likely that the AgII can function as a carrier of oxidising power from the anode to the CoII in solution and can oxidise this to CoIII which then reacts like AgII in the electrolyte. Another advantage is that cobalt is not affected to any great extent by halide ions which could give problems of precipitation with silver. Hence halogen-containing waste matter or other matter may be treated.

The cathode 28 might be constructed of platinum, platinum-coated titanium, gold, gold-plated titanium, or stainless steel, the choice of material being dictated by cost and availability. There is some advantage in the use of platinum or gold since this reduces the polarisation of the cathode and thereby the cell voltage, with a resultant saving in operating costs.

When the waste matter comprises a liquid such as a mixture of tributyl phosphate and kerosene (TBP/OK), the liquid forms a layer 33 on top of the electrolyte 11 from which the liquid is drawn by the impeller 32 and circulated through the cell 10.

When the waste matter comprises solid material such as tissues, rubber or plastics the waste matter is shredded before being introduced into the cell 10. Also, where a pre-treatment step, for example heating in nitric acid is employed, this step can be carried out in the same cell 10 with the heat exchanger 34 being used to heat the contents of the cell 10. Following this step the heat exchanger 34 can be then used to adjust the temperature of the cell before the addition of $AgNO_3$ and electrolysis.

Although the cell 10 as shown has two limbs 14, 16, other types of electrochemical cells may be used. The type of cell 10 illustrated is preferred when the liquid contains fissile isotopes, such as uranium −235 or plutonium −239, since criticality can be avoided by virtue of the geometry of the cell and by placing neutron absorbing material between the limb 14 and the limb 16.

When the waste matter comprises TBP/OK, the TBP/OK is oxidatively decomposed by the silver (II) to carbon dioxide, water and phosphoric acid, with the silver (II) being converted to silver (I). The silver (II) acts predominantly on the TBP/OK indirectly by generating a secondary oxidising species from the electrolyte which then acts on the TBP/OK. Silver (I) is anodically oxidised back to silver (II) which can then act further as described above. Relatively high temperatures such as 80° C. or higher (e.g. 90° C.+) may be used to improve the efficiency of the electrochemical reactions taking place. Although decomposition of an organically-based liquid will proceed at room temperature, a temperature greater than 50° C. is preferred because of the more favourable decomposition achieved.

The process is similar when the waste matter comprises rubber, tissues, plastics, or ion exchangers.

By use of an electrolyte comprising nitric acid, any radioactive contaminants on the waste matter such as plutonium, are dissolved in the nitric acid during the decomposition of the waste matter. The nitric acid can be periodically removed from the cell and the plutonium originating from the waste matter recovered by solvent extraction.

When the waste matter is contaminated with toxic material which itself comprises organically-based matter, the toxic material can be decomposed into non-toxic components. By decomposing the waste matter in this way a reduction in the volume of waste requiring storage is achieved. This is particularly so since the products of the decomposition include volatile non-toxic molecules which can be vented to the atmosphere.

It will be appreciated that the decomposition may be carried out continuously since the secondary oxidising species is continuously generated. In continuous operation, any non-volatile decomposition products may be periodically or continuously drained from the cell and the electrolyte strength periodically or continuously adjusted.

The reduction of the nitric acid catholyte at the cathode 28 gives rise to products which may include nitrous acid, nitrogen dioxide, nitric oxide, the exact product or products being determined by the cathode material and/or the current density. Depending on the scale and nature of the process, fresh nitric acid may be added to replace the acid reduced, or the acid may be recovered and recycled after appropriate treatment to restore it to the correct concentration. The acid may be recovered by scrubbing the nitrogen oxides from the catholyte off-gas at the vent 26, using water or dilute acid, followed by concentration in an evaporator (if necessary) before the acid is returned to the catholyte. However, the second aspect of the invention provides a method of regenerating the catholyte nitric acid without the necessity of an energy-intensive evaporation/condensation step, or a cathode process involving the evolution of gas to any substantial extent.

The cathode reaction which is preferred is the reduction of nitric acid to nitrous acid, which does not involve the evolution of gas at the cathode 28. This is the primary reaction at a titanium stainless steel or platinum cathode within certain limits of current density. If the concentration of nitrous acid is allowed to build up in the catholyte, further reduction to $NO_2$ and NO occurs, the exact route depending on the catholyte acidity, etc. This results in gas evolution at the cathode 28, with the consequential possible problems of frothing and gas blanketing raising the resistance of the electrolyte.

Referring now to FIG. 2, an electrochemical cell similar to that of FIG. 1 is shown diagrammatically at 40, and has a cathode compartment 42 displaced by a separator 44 from an anode compartment 46. A water supply 41, a solvent supply 43 and a vent 45 for carbon dioxide, connect with the anode compartment 46, and a cooling system 47 recycles anolyte from the anode compartment 46.

The catholyte is continuously withdrawn from the cathode compartment 42 via a feed tank 43 and a regenerative heat exchanger 48, and is fed to the top of a packed column 50. Below the packed column 50 is a steam heated boiler 52 containing nitric acid at the catholyte concentration and refluxing into the packed column 50. Air or oxygen is injected through a duct 56 into a vapour space 58 above the refluxing nitric acid in the boiler 52. As the catholyte containing nitric and nitrous acids descends in the packed column 50 it is heated to the boiling point of the refluxing nitric acid (typically 107°–112° C.) and the nitrous acid decomposes to $HNO_3$, $NO_2$, NO and water. The NO is oxidised to $NO_2$ by the air or oxygen and is absorbed into the liquor descending the packed column 50 which is composed of the circulating catholyte and the condensate refluxing into the packed column 50 from the nitric acid boiler 52. The liquor reaching the boiler 52 thereby comprises essentially pure nitric acid. The reflux rate of the boiler 52 is maintained such that an appropriate length of the column 50 packing is maintained at reflux temperature. This ensures that all of the nitrous acid in the descending catholyte is destroyed by the time that the liquor reaches the boiler 52. The catholyte circulation rate may be the rate necessary to adequately wet the column 50 packing, as determined by the usual design criteria for scrubber columns, etc but this is not essential. The total liquor flow in the hot part of the packed column 50, where most of the absorption of NOx, etc is going on is composed of the catholyte flow and the refluxing acid flow from the boiler 52, and the latter can be adjusted by increasing or decreasing the boiler 52 reflux rate to bring the active part of the packed column 50 into the correct flow regime. It is desirable that most of the liquor flow descending the active part of the packed column 50 entering the boiler 52 consists of condensate rather than liquor from the cathode compartment. The condensate is essentially free of nitrous acid or NOx and dilutes the descending catholyte such that the combined liquor scrubs the NOx evolved from the destruction of the catholyte nitrous acid more efficiently. The catholyte entering the packed column 50 only scrubs NOx poorly because of its nitrous acid content.

The liquor in the boiler 52 is removed at the same rate as the entering catholyte and passes to the regenerative heat exchanger 48 where it heats the catholyte before the catholyte enters the packed column 50. The liquor then passes to a cooler 60 where its temperature is reduced to a level depending on the exact requirements in the cell 40 and is then passed through a feed tank 63 and is sprayed into the top of a scrubber 64. Any NOx escaping from the column 50, plus any NOx being generated at the cathode compartment 42 is vented into the bottom of the scrubber 64 and is absorbed by the descending nitrous acid-free returning catholyte. The air or oxygen injected into the vapour space 58 of the boiler is fed at a rate sufficient to oxidise any NO to $NO_2$ in both the packed column 50 and the scrubber 64. The liquor reaching the bottom of the scrubber 64 is returned to the cathode compartment 44 of the cell 40, via a reservoir 66 if necessary. If the column 50 is working properly, the amount of NOx escaping therefrom may be low enough to permit the scrubber 64 to be omitted altogether. The decision as to whether the scrubber 64 should be included would be made on the basis of an assessment of the permissible emission of NOx from the system, the loss of nitric acid and its replacement cost, compared to the capital and operating cost of the additional scrubber 64 and associated equipment, etc.

Use of the returning catholyte to scrub any NOx from the cell 40 and column 50 off-gas dispenses with the need to have a separate scrubber (and possible evaporator) system. There is a slight penalty in that use of the catholyte as scrubber liquor results in a slightly increased concentration of nitrous acid in the liquor returning to the cathode compartment 42 and there is the possibility of slightly increased generation of NOx at the cathode. However, trials have shown that if the system is operating correctly, the scrubber 64 duty is very light and little NOx is produced at the cathode from the obviously very low concentration of nitrous acid in the catholyte, thus slight non-zero catholyte nitrous acid concentrations can be tolerated.

The embodiment shown in FIG. 2 shows the entire catholyte flow being routed via the packed column 50. This is not essential to the operation of the process and it may be desirable to circulate the catholyte rapidly through a heat exchanger (not shown) for cooling purposes but much more slowly through the column 50 at a rate set by the rate of generation of nitrous acid at the cathode and the desired steady state concentration thereof in the catholyte. This reduces the rate at which catholyte has to be heated up to boiling and should save on energy costs.

A further and unexpected advantage was found to accrue from use of the system of FIG. 2, in that there is far less tendency for the anolyte acidity and the cell voltage to rise. Operation of the cell 40 at a very low steady state catholyte nitrous acid concentration suppresses NOx formation at the cathode, and reduces the cell voltage. There is then little or no nitrous acid concentration gradient across the separator 44, and migration of nitrite to the anolyte is suppressed, resulting in better control of anolyte acidity. Alternatively, the use of a cation-exchange membrane which would inhibit migration of anions such as nitrite from catholyte to anolyte, would permit higher catholyte nitrous acid concentrations to be tolerated without any serious adverse effect on anolyte acidity. This is an advantage when only a portion of the catholyte is regenerated by the system of FIG. 2.

It will be understood that the method of the second aspect of the invention, and the system of FIG. 2 may have other applications not necessarily in association with electrochemical cells, although there are advantages in the operation of the electrochemical cell when it is used in conjunction with the method of the first aspect of the invention.

It will also be appreciated that the invention includes an electrochemical method of treating matter in which an electrolyte containing silver and cobalt ions is subjected to an electric potential, and the matter is added to the electroylte.

I claim

1. A method of treating organic waste matter in which an aqueous electrolyte comprising nitric acid and containing silver ions as an electrochemically regenerable primary oxidising species is subjected to an electric potential, characterised in that the method is performed at a temperature above 50° C. to produce secondary oxidising species from the interaction of the primary oxidising species and the aqueous electrolyte, and the organic matter is added to the electrolyte either continuously or periodically whereby decomposition of the initially and the subsequently added organic matter is predominantly effected by the secondary oxidising species, the primary oxidising species following reduction in the course of the interaction with the aqueous electrolyte being regenerated by the electric potential.

2. A method as claimed in claim 1, wherein the electrolyte includes cobalt ions.

3. A method as claimed in claim 1, wherein the temperature is between 55° C. and 80° C.

4. A method as claimed in claim 1, wherein the temperature is between 70° C. and 90° C.

5. A method as claimed in claim 1, wherein the nitric acid is in the range 4M to 16M.

6. A method as claimed in claim 2 wherein the electrolyte comprises 5M nitric acid, and includes 0.6M cobalt nitrate and 0.0025M silver nitrate.

7. A method as claimed in claim 1, wherein before the application of the electric potential, the organic waste matter is heated in the electrolyte to a temperature at which the organic waste matter is partially decomposed or rendered more soluble in the electrolyte.

8. A method as claimed in claim 7, wherein the organic waste matter is treated with ozone in the electrolyte.

9. A method as claimed in claim 1, wherein the organic waste matter comprises, cellulose, or rubber, or plastics material, or an ion exchange material.

10. A method as claimed in claim 1, wherein the organic waste matter comprises a non-silicone organic liquid.

11. A method as claimed in claim 10, wherein the liquid comprises tributyl phosphate and kerosene, and includes the subsequent step of neutralising anolyte produced from the electrolyte to precipitate silver phosphate therefrom, and subsequently dissolving the precipitated silver phosphate in nitric acid to produce anolyte therefrom.

12. A method as claimed in claim 1, wherein at least a portion of the catholyte thereof is withdrawn and regenerated by feeding said catholyte portion to a packed column such that said catholyte portion descends through the packed column, heating an aqueous solution comprising nitric acid such that the heated said nitric acid refluxes into the packed column, and passing an oxygen-containing gas into said catholyte portion, whereby said catholyte portion is converted substantially to nitric acid as it descends in the packed column.

13. A method as claimed in claim 12, wherein the withdrawal and regeneration of said portion of the catholyte is arranged so as to recycle regenerated said catholyte to the electrolyte and maintain a relatively low catholyte nitrous acid concentration in the electrolyte.

14. A method as claimed in claim 12, including inhibiting the migration of anions from the catholyte to the anolyte in the electrolyte.

* * * * *